Nov. 19, 1929. H. D. CURTIS Re. 17,498
SNOW REMOVER
Filed May 19. 1922
2 Sheets-Sheet 1
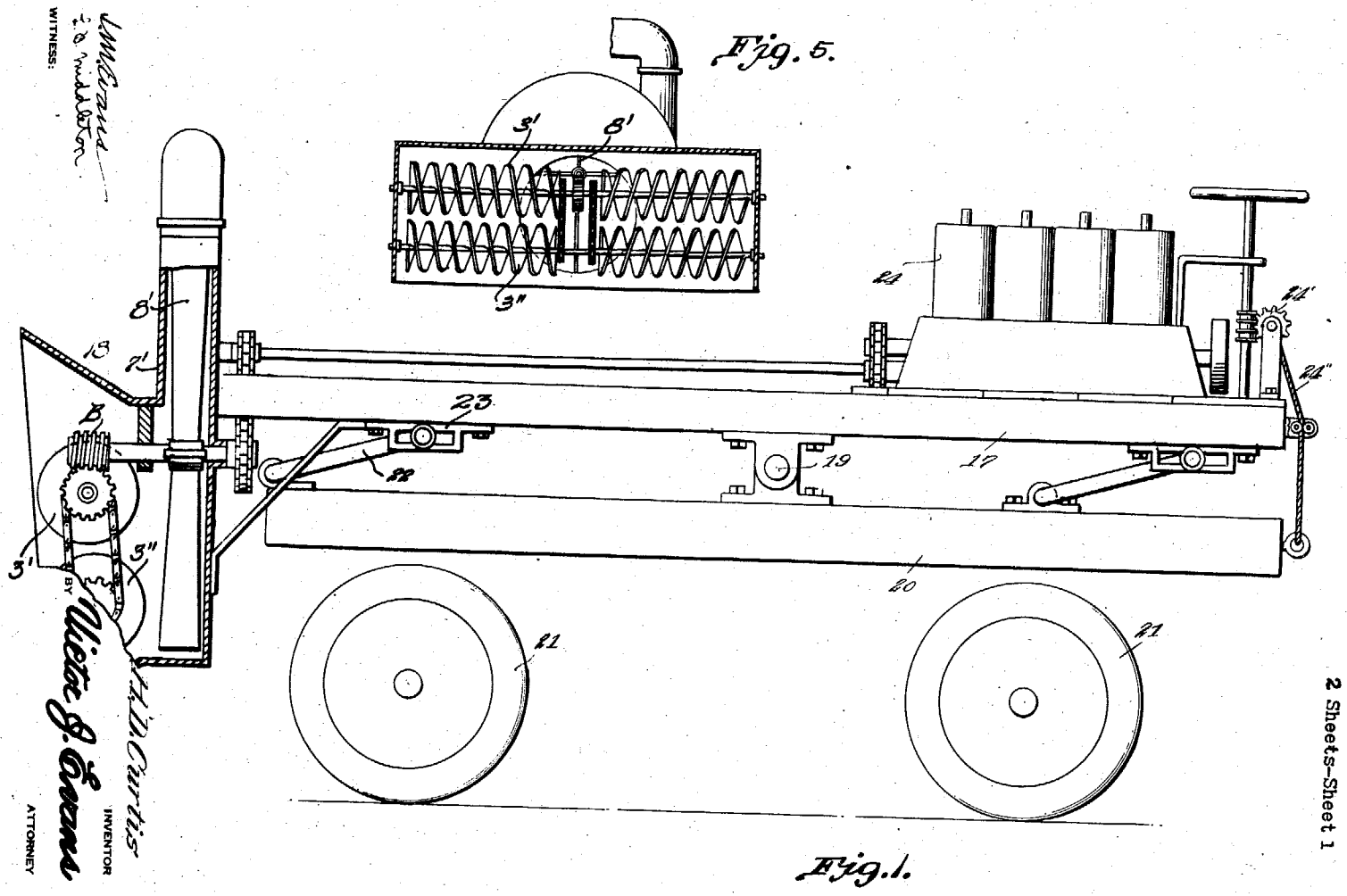
H. D. Curtis
INVENTOR
BY Victor J. Evans
ATTORNEY
S. M. Evans
E. O. Middleton
WITNESS:

Nov. 19, 1929. H. D. CURTIS
SNOW REMOVER
Filed May 19, 1922
Original Filed May 19, 1922 2 Sheets-Sheet 2
Re. 17,498
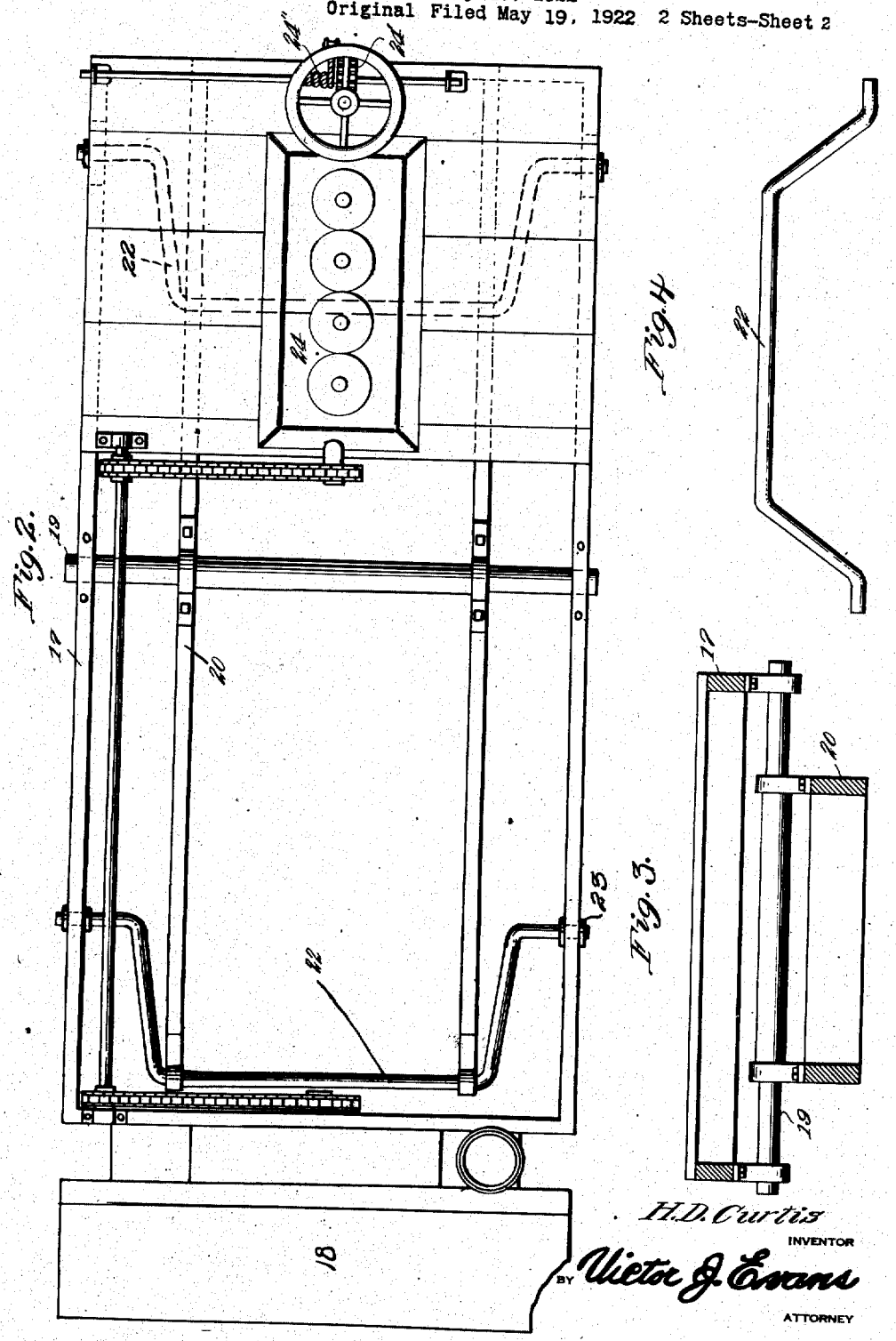
H. D. Curtis
INVENTOR
BY Victor J. Evans
ATTORNEY Reissued Nov. 19, 1929 Re. 17,498

UNITED STATES PATENT OFFICE

HARRY D. CURTIS, OF OSHKOSH, WISCONSIN, ASSIGNOR TO DANIEL WANDSCHEER, GERRIT WANDSCHEER, JACOB WANDSCHEER, AND BEN WANDSCHEER, ALL OF SIOUX CENTER, IOWA

SNOW REMOVER

Original No. 1,623,910, dated April 5, 1927, Serial No. 562,155, filed May 19, 1922. Application for reissue filed October 5, 1928. Serial No. 310,650.

This invention relates to snow plows for use on trucks, tractors, railroads and the like, the general object of the invention being to provide snow handling mechanism for removing the snow from the track or road surface and conveying it either to the sides of the road or to a suitable conveyance.

A further object of the invention is to provide a novel supporting structure for the snow mechanism and means for adjusting the mechanism in relation to the track or road surface.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of the truck construction and showing a snow removing apparatus associated therewith.

Figure 2 is a top plan view.

Figure 3 is a transverse sectional view taken through the frame of the truck.

Figure 4 is a detail view of one of the crank arms which support the respective ends of the truck body.

Figure 5 is a fragmentary sectional view of the snow removing apparatus.

Referring to the drawings, the snow removing apparatus includes a casing 18 within which is arranged any suitable snow handling mechanism. In the form illustrated, the casing contains upper and lower spiral conveyors 3′ and 3″ formed of left and right screw parts that function to move the snow inwardly from the outer ends of the casing and pass into a centrally arranged rear casing 7′ containing the fan 8′. It will be understood that more than two conveyors may be employed and any other suitable means may be substituted for the fan. The conveyors may also be arranged on an angle with the receiving end in advance of the delivery end. The conveyor shafts are connected by a chain and sprocket drive, one of said shafts being driven from the fan shaft by the gear B.

The snow removing mechanism is supported upon the front end of a suitable frame 17. The sides of the frame are connected to a shaft 19 mounted upon a main vehicle frame 20 and located intermediate the ends thereof. The wheels 21 of the vehicle may be provided with flanges when the vehicle is to be used upon a railroad or the wheels may be of any well known road type when the mechanism is to be used upon a road. Crank members 22 are mounted upon each end of the frame 20, the ends of such cranks being slidably connected as at 23 with the frame 17. The power plant 24 for operating the fan and conveyors is located upon the rear end of the frame 17 and on the opposite side of pivot shaft 19. The frame 17 is tilted about the shaft 19 by means of the windlass 24′ and the cable 24″, said cable being attached to the rear end of the vehicle frame 20. The weight of the power plant approximates that of the snow handling mechanism and the front end of the frame 17 and thus relieves the strain on the cable 24′. By means of the windlass and cable the frame 17 can be easily and expeditiously adjusted relative to the vehicle frame 20 so as to regulate the position of the snow handling mechanism relative to the road surface. The cranks 22 keep the frame 17 in proper position upon the vehicle frame and prevents lateral twisting or turning between these parts.

It is thought from the foregoing description that the advantages and novel features of the invention will be readily apparent. It should be understood that I may make changes in the construction and in the combination and arrangement of the several parts providing that such changes fall within the scope of the appended claims.

Having thus described the invention, what I claim is new, and desire to secure by Letters Patent of the United States, is:

1. A snow remover comprising a vehicle having a main frame, a transversely disposed fulcrum member carried by said frame intermediate the ends thereof, a secondary frame rockably supported intermediate its ends by said fulcrum member, a rotary snow plow mounted at one end of the secondary frame, power means at the opposite end of said secondary frame for driving said snow plow, and means for rocking the secondary frame about the fulcrum member to vary the height of the snow plow with respect to the ground.

2. A snow remover comprising a vehicle having a main frame, a secondary frame rockably supported upon said main frame intermediate its ends, a power-operated rotary snow plow mounted at one end of the secondary frame, a power plant mounted at the opposite end of said secondary frame in such manner as to counterbalance the weight of the snow plow, driving connections between the power plant and the plow, and means for adjustably rocking the secondary frame with respect to the main frame to vary the height of the snow plow above the ground.

3. A snow remover comprising a vehicle having a main frame, a secondary frame rockably supported upon said main frame intermediate its ends, a snow plow mounted at one end of the secondary frame, a power plant mounted upon the opposite end of the secondary frame in such a manner as to counterbalance the weight of the snow plow, means for adjustably rocking the secondary frame with respect to the main frame to vary the height of the snow plow above the ground, and a crank provided on at least one end of the vehicle, said crank having one portion journaled in the main frame and the other received in a portion of the secondary frame.

4. A snow plow of the character described comprising a wheeled vehicle, a frame pivotally secured midway the ends of the vehicle, bearings secured to the frame and vehicle respectively, cranks having their upper ends pivoted in the bearings of the frame and the lower portions of said cranks being received in the bearings of the vehicle, a snow removing apparatus fixed to the front of the frame, a motor for driving the snow removing apparatus and also adapted to counterbalance the weight thereof, and a windlass associated with the rear end of the frame and vehicle respectively to tilt the frame on its pivot for adjustably associating the snow removing apparatus with respect to the ground in front of the vehicle.

5. A snow plow comprising a vehicle having a main frame, a secondary frame rockably supported upon said main frame intermediate its ends, a power-operated rotary snow plow mounted at one end of the secondary frame, a power plant mounted at the opposite end of the secondary frame in such a manner as to counterbalance the weight of the snow plow, driving connections between the power plant and the plow, means for adjustably rocking the secondary frame with respect to the main frame to vary the height of the snow plow above the ground, and means for guiding the secondary frame during its rocking movement.

In testimony whereof, I have hereunto set my signature.

HARRY D. CURTIS.